United States Patent
Neuhaus et al.

(10) Patent No.: US 11,142,616 B2
(45) Date of Patent: Oct. 12, 2021

(54) METHOD FOR PRODUCING PULTRUDED PRODUCTS ON THE BASIS OF POLYURETHANE

(71) Applicant: BASF SE, Ludwigshafen am Rhein (DE)

(72) Inventors: Bert Neuhaus, Dinslaken (DE); Julia Goeschel, Bremen (DE)

(73) Assignee: BASF SE, Ludwigshafen am Rhein (DE)

( * ) Notice: Subject to any disclaimer, the term of this patent is extended or adjusted under 35 U.S.C. 154(b) by 291 days.

(21) Appl. No.: 16/094,978

(22) PCT Filed: Apr. 11, 2017

(86) PCT No.: PCT/EP2017/058629
§ 371 (c)(1),
(2) Date: Oct. 19, 2018

(87) PCT Pub. No.: WO2017/182323
PCT Pub. Date: Oct. 26, 2017

(65) Prior Publication Data
US 2019/0092911 A1 Mar. 28, 2019

(30) Foreign Application Priority Data

Apr. 21, 2016 (EP) .................................... 16166289

(51) Int. Cl.
| | |
|---|---|
| C08J 5/04 | (2006.01) |
| B29C 70/52 | (2006.01) |
| C08G 18/48 | (2006.01) |
| C08G 18/66 | (2006.01) |
| C08G 18/76 | (2006.01) |
| C08K 3/32 | (2006.01) |
| C08G 18/20 | (2006.01) |
| C08G 18/22 | (2006.01) |
| C08G 18/32 | (2006.01) |
| C08L 75/04 | (2006.01) |
| C08G 18/79 | (2006.01) |
| C08G 18/16 | (2006.01) |
| C08G 18/78 | (2006.01) |
| C08K 5/09 | (2006.01) |
| C08K 13/02 | (2006.01) |
| B29K 75/00 | (2006.01) |

(52) U.S. Cl.
CPC ............ *C08J 5/043* (2013.01); *B29C 70/52* (2013.01); *C08G 18/163* (2013.01); *C08G 18/2063* (2013.01); *C08G 18/225* (2013.01); *C08G 18/3206* (2013.01); *C08G 18/485* (2013.01); *C08G 18/4816* (2013.01); *C08G 18/4825* (2013.01); *C08G 18/4829* (2013.01); *C08G 18/4845* (2013.01); *C08G 18/6674* (2013.01); *C08G 18/7664* (2013.01); *C08G 18/7671* (2013.01); *C08G 18/78* (2013.01); *C08G 18/797* (2013.01); *C08J 5/04* (2013.01); *C08K 3/32* (2013.01); *C08K 5/09* (2013.01); *C08K 13/02* (2013.01); *C08L 75/04* (2013.01); *B29K 2075/00* (2013.01); *C08J 2375/04* (2013.01); *C08J 2375/08* (2013.01); *C08K 2003/324* (2013.01)

(58) Field of Classification Search
CPC ..... B29C 70/52–528; C08J 5/043; C08J 5/04; C08J 2375/04; C08J 2375/08; C08L 75/04; C08G 18/4845; C08G 18/797; C08G 18/163; C08G 18/485; C08G 18/78; C08G 18/4825; C08G 18/4829; C08G 18/6674; C08G 18/7664; C08G 18/7671; C08G 18/2063; C08G 18/225; C08G 18/3206; C08G 18/4816; C08G 18/18; C08G 2125/00; C08K 5/09; C08K 13/02; C08K 3/32; C08K 2003/324; C08K 5/10; B29K 2075/00
See application file for complete search history.

(56) References Cited

U.S. PATENT DOCUMENTS

| | | | | |
|---|---|---|---|---|
| 3,395,108 | A * | 7/1968 | Cobbledick | C08L 75/08 524/871 |
| 2004/0094859 | A1* | 5/2004 | Cheolas | B29C 70/521 264/136 |
| 2006/0173128 | A1* | 8/2006 | Connolly | B29C 70/521 524/589 |
| 2007/0113983 | A1* | 5/2007 | Brown | C08G 18/7657 156/441 |

(Continued)

FOREIGN PATENT DOCUMENTS

| | | |
|---|---|---|
| CN | 101432328 A | 5/2009 |
| WO | 2005049301 A2 | 2/2005 |

(Continued)

OTHER PUBLICATIONS

International Search Report for International Application No. PCT/EP2017/058629, dated May 7, 2017, 2 pages.

(Continued)

*Primary Examiner* — Jeffrey M Wollschlager
(74) *Attorney, Agent, or Firm* — Armstrong Teasdale LLP

(57) ABSTRACT

Described herein is a process for the production of a pultrudate by mixing (a) di- or polyisocyanates, (b) compounds having at least two groups reactive toward isocyanates, (c) catalyst, (d) mold-release agent, and optionally, (e) other auxiliaries and additional substances, to give a pultrusion resin system, and wetting and hardening a fiber material therewith, where the di- and polyisocyanates (a) are mixed with a polyol component (B) including compounds (b) having at least two groups reactive toward isocyanates, catalysts (c) mold-release agents (d) and optionally other auxiliaries and additional substances (e), and the pH of the polyol component (B) is in the range from 6.5 to 8.5. Also described herein is a pultrudate obtainable by this process.

11 Claims, No Drawings

(56) References Cited

U.S. PATENT DOCUMENTS

| | | |
|---|---|---|
| 2007/0116941 A1 | 5/2007 | Brown et al. |
| 2007/0117921 A1 | 5/2007 | Brown et al. |
| 2008/0087373 A1 | 4/2008 | Hayes et al. |
| 2008/0090921 A1 | 4/2008 | Hayes et al. |
| 2008/0090996 A1 | 4/2008 | Duffy et al. |
| 2008/0241458 A1* | 10/2008 | Jenkines ............... C08G 18/60 428/95 |
| 2009/0159196 A1* | 6/2009 | Jenkines ............ D06N 7/0071 156/275.5 |
| 2012/0252973 A1* | 10/2012 | Nienkemper ...... C08G 18/6692 524/875 |
| 2013/0309924 A1* | 11/2013 | Wegener ............... C08G 18/58 442/59 |
| 2014/0106637 A1* | 4/2014 | Bertucelli ............... C08K 3/22 442/136 |
| 2014/0265000 A1* | 9/2014 | Magnotta ................ C08K 7/14 264/137 |
| 2014/0367021 A1* | 12/2014 | Schleiermacher .... B29C 70/525 156/73.2 |
| 2018/0186100 A1* | 7/2018 | Kiilunen ............... B29C 70/542 |

FOREIGN PATENT DOCUMENTS

| | | |
|---|---|---|
| WO | 2005038118 A1 | 4/2005 |
| WO | 2011067246 A1 | 6/2011 |

OTHER PUBLICATIONS

European Search Report for priority application EP Patent Application No. 16166289.5, dated Jun. 6, 2016, 4 pages. No English translation available.

* cited by examiner

METHOD FOR PRODUCING PULTRUDED PRODUCTS ON THE BASIS OF POLYURETHANE

CROSS-REFERENCE TO RELATED APPLICATIONS

This application is a U.S. National Phase Application of PCT/EP2017/058629, filed Apr. 11, 2017, which claims the benefit of priority to European Patent Application No. 16166289.5, filed Apr. 21, 2016, the entire contents of which are hereby incorporated by reference herein.

FIELD OF INVENTION

The present invention relates to a process for the production of a pultrudate by mixing (a) di- or polyisocyanates, (b) compounds having at least two groups reactive toward isocyanates, (c) catalyst, (d) mold-release agent and optionally, (e) other auxiliaries and additional substances, to give a pultrusion resin system, and wetting and hardening a fiber material therewith, where the di- and polyisocyanates (a) are mixed with a polyol component (B) comprising compounds (b) having at least two groups reactive toward isocyanates, catalysts (c) mold-release agents (d) and optionally other auxiliaries and additional substances (e), and the pH of polyol component (B) is in the range from 6.5 to 8.5. The present invention further relates to a pultrudate obtainable by this process.

BACKGROUND

Pultrusion is a continuous process for the production of fiber-reinforced profiles with constant cross section. A pultrusion system is typically composed of an impregnation unit and a heated mold, and also of a take-off system which provides the motive force for the process. The fibers are impregnated in an open bath or in a closed injection box. This is where the resin wets the reinforcement material, for example glassfiber rovings or glassfiber mats. Shaping then takes place in the heated mold, as also does the hardening of the composite. The finished profile is drawn from the mold by means of a take-off system and finally is cut into the desired lengths.

For maximum efficiency of the pultrusion process, high process velocities are desired, together with very good mechanical properties of the pultrudate and high surface quality. A significant factor here is low adhesion of the composite on the mold surface.

Bayer, Huntsman, Milgard Manufacturing Incorporated, Resin Systems Inc. and others have already described the use of two-component polyurethane systems for the pultrusion process. Materials mainly used are polyether polyols with functionality 3.0, these being reacted with isocyanates, often polymeric MDI, in the presence of amines and, respectively, metal complexes as catalysts, and also various additives. It has been found here that surface quality becomes poorer as process velocity increases. Fully reacted polyurethane or PU powder is often observed on the profile surface. High take-off velocities have an adverse effect on wetting quality, and therefore on the mechanical properties of the pultrudates. These phenomena in turn impose upward limits on process velocity.

Huntsman counters this problem in WO 2005/049301 by using two metal catalysts. Bayer uses systems based on DMC polyols (US 2008/0090921) or on graft polyols (US 2008/0087373), and uses immiscible PU systems (US 2008/0090996). Both Bayer and also Huntsman moreover mention the use, in principle, of acids for partial neutralization, i.e. blocking, of amine catalysis. Specific examples mentioned in WO 2005038118 comprise formic acid, acetic acid, 2-ethylhexanoic acid and oleic acid.

In US 2007/0113983, US 2007/0116941 and US 2007/0117921, Milgard Manufacturing Incorporated says that it is in principle possible to improve surface quality by adding, to the polyurethane system, polymeric additives which reduce resin shrinkage. These "low-profile additives" are added at a concentration that is preferably from 4 to 10%, based on the entire resin system. The expression polymeric additives here means polystyrenes, styrene-acrylate copolymers, methacrylate resins, polyvinyl acetates and protected polypropylene oxides.

WO 2011/067246 describes a pultrusion process where an acid which has a boiling point of at least 200° C. and relatively high functionalities is added to the pultrusion resin system. Although this reduces take-off forces and improves the surface of the pultrudate, these parameters continue to require improvement.

DESCRIPTION

It was therefore an object of the present invention to provide a process which can produce pultrudates and which further reduces the forces required for take-off of the pultrudate from the mold, and which leads to an improved pultrudate surface. This is in particular relevant for industrial requirements of high take-off velocities above 1 m/minute and/or complex molding geometries Said object has been achieved via a process for the production of a pultrudate by mixing (a) di- or polyisocyanates, (b) compounds having at least two groups reactive toward isocyanates, (c) catalyst, (d) mold-release agent and optionally, (e) other auxiliaries and additional substances, to give a pultrusion resin system, and wetting and hardening a fiber material therewith, where the di- and polyisocyanates are mixed with a polyol component (B) comprising compounds (b) having at least two groups reactive toward isocyanates, catalysts (c) mold-release agents (d) and optionally other auxiliaries and additional substances (e), and the pH of polyol component (B) is in the range from 6.5 to 8.5. The present invention further relates to a pultrudate obtainable by this process.

For the purposes of the invention, the expression pultrusion resin system means a system which is composed of various components and which is suitable, after the components have been mixed together, for forming a pultrudate with a fiber material.

Di- or polyisocyanates (a) that can be used comprise any of the aliphatic, cycloaliphatic or aromatic isocyanates known for the production of polyurethanes. Examples are diphenylmethane 2,2'-, 2,4' and 4,4'-diisocyanate, the mixtures of monomeric diphenyl methane diisocyanates and homologues of diphenylmethane diisocyanate having a larger number of rings (polymeric MDI), isophorone diisocyanate (IPDI) and its oligomers, tolylene diisocyanate (TDI), examples being tolylene diisocyanate isomers such as tolylene 2,4- or 2,6-diisocyanate and mixtures of these, tetramethylene diisocyanate and its oligomers, hexamethylene diisocyanate (HDI) and its oligomers, naphthylene diisocyanate (NDI) and mixtures thereof.

Di- or polyisocyanates (a) used preferably comprise isocyanates based on diphenylmethane diisocyanate, in particular polymeric MDI. The functionality of the di- and polyisocyanates (a) is preferably from 2.0 to 2.9, particularly preferably from 2.1 to 2.8. The viscosity of these di- or polyisocyanates (a) at 25° C. in accordance with DIN 53019-1 to 3 is preferably from 5 to 600 mPas and particularly preferably from 10 to 300 mPas.

Di- and polyisocyanates (a) can also be used in the form of polyisocyanate prepolymers. These polyisocyanate prepolymers are obtainable in that polyisocyanates described above (constituent (a-1)) are reacted in excess with compounds having at least two groups reactive toward isocyanates (constituent (a-2)), for example at temperatures of from 30 to 100° C., preferably at about 80° C., to give the prepolymer. The NCO content of polyisocyanate prepolymers of the invention is preferably from 20 to 33% by weight of NCO, particularly preferably from 25 to 32% by weight of NCO.

Compounds having at least two groups reactive toward isocyanates (a-2) are known to the person skilled in the art and are described by way of example in "Kunststoffhandbuch, 7, Polyurethane" [Plastics handbook, 7, Polyurethanes], Carl Hanser-Verlag, $3^{rd}$ edition 1993, chapter 3.1. It is therefore possible by way of example that compounds used having at least two groups reactive toward isocyanates comprise polyether- or polyesterols such as those described under (b) below. It is preferable that compounds used having at least two groups reactive toward isocyanates (a-2) comprise polyether- or polyesterols comprising secondary OH groups, an example being polypropylene oxide. The functionality of the polyether- or polyesterols here is preferably from 2 to 4, particularly preferably from 2 to 3.

It is particularly preferable to use no polyisocyanate prepolymers.

Compounds used having at least two groups (b) reactive toward isocyanates, another term used for these for the purposes of this invention being "polyols", can comprise any of the compounds having at least two groups reactive toward isocyanates, for example OH, SH, NH, $NH_2$, COOH and CH-acidic groups, where the proportion of secondary OH groups, based on the number of groups reactive toward isocyanates, is at least 50%, preferably at least 60%, particularly preferably at least 70% and in particular at least 80%.

Materials usually used are polyetherols and/or polyesterols having from 2 to 8 isocyanate-reactive hydrogen atoms and low-molecular-weight polyols such as glycerol, dipropylene glycol and/or tripropylene glycol. The OH number of these compounds is usually in the range from 30 to 2000 mg KOH/g, preferably in the range from 40 and 1000 mg KOH/g. The average OH number of all of the compounds used here having at least two groups (b) reactive toward isocyanates is from 100 to 1000 mg KOH/g, preferably from 300 to 900 mg KOH/g.

The polyetherols are obtained by known processes, for example via anionic polymerization of alkylene oxides with addition of at least one starter molecule comprising from 2 to 8, preferably from 2 to 6, and particularly preferably from 2 to 4, reactive hydrogen atoms, in the presence of catalysts. Catalysts used can comprise alkali metal hydroxides such as sodium hydroxide or potassium hydroxide, or alkali metal alcoholates such as sodium methanolate, sodium ethanolate, potassium ethanolate or potassium isopropanolate, or in the case of cationic polymerization Lewis acids such as antimony pentachloride, boron trifluoride etherate or bleaching earth. Double metal cyanate compounds, known as DMC catalysts, can also moreover be used as catalysts.

Alkylene oxides used preferably comprise one or more compounds having from 2 to 4 carbon atoms in the alkylene moiety, for example tetrahydrofuran, ethylene oxide, propylene 1,2-oxide, or butylenes 1,2- or 2,3-oxide, in each case alone or in the form of a mixture, and preferably propylene 1,2-oxide and/or ethylene oxide, in particular propylene 1,2-oxide.

Examples of starter molecules that can be used are ethylene glycol, diethylene glycol, glycerol, trimethylolpropane, pentaerythritol, sugar derivatives such as sucrose, hexitol derivatives such as sorbitol, methylamine, ethylamine, isopropylamine, butylamine, benzylamine, aniline, toluidine, toluenediamine, naphthylamine, ethylenediamine, diethylenetriamine, 4,4'-methylenediamine, 1,3-propanediamine, 1,6-hexanediamine, ethanolamine, diethanolamine, triethanolamine, and also other di or polyhydric alcohols or mono or polyfunctional amines.

The polyester alcohols used are mostly produced via condensation of polyhydric alcohols having from 2 to 12 carbon atoms, for example ethylene glycol, diethylene glycol, butanediol, trimethylolpropane, glycerol or pentaerythritol, with polybasic carboxylic acids having from 2 to 12 carbon atoms, for example succinic acid, glutaric acid, adipic acid, suberic acid, azeleic acid, sebacic acid, decanedicarboxylic acid, maleic acid, fumaric acid, phthalic acid, isophthalic acid, terephthalic acid and the isomers of naphthaledicarboxylic acids or anhydrides thereof.

Other starting materials that can also be used concomitantly in the production of the polyesters comprise hydrophobic substances. The hydrophobic substances are substances that are insoluble in water and comprise a nonpolar organic moiety, and also have at least one reactive group selected from hydroxy, carboxylic acid, carboxylic ester and mixtures thereof. The equivalent weight of the hydrophobic materials is preferably from 130 to 1000 g/mol. Examples of materials that can be used are fatty acids, for example stearic acid, oleic acid, palmitic acid, lauric acid or linoleic acid, and also fats and oils, for example castor oil, maize oil, sunflower oil, soybean oil, coconut oil, olive oil or tall oil. When polyesters comprise hydrophobic substances, the proportion of the hydrophobic substances, based on the entire monomer content of the polyester alcohol, is preferably from 1 to 30 Mol %, particularly preferably from 4 to 15 Mol %.

The functionality of the polyesterols used is preferably from 1.5 to 5, particularly preferably from 1.8 to 3.5.

In a particularly preferred embodiment, compounds used having groups (b) reactive toward isocyanates comprise polyetherols, in particular exclusively polyetherols. It is preferable that the actual average functionality of the polyetherols is from 2 to 4, particularly from 2.5 to 3.5, in particular from 2.8 to 3.2, that their OH number is from 300 to 900 mg KOH/g, and that their content of secondary OH groups is at least 50%, with preference at least 60%, with particular preference at least 70% and in particular at least 80%. Polyetherol used here preferably comprises polyetherol based on based on glycerol as starter and propylene 1,2 oxide.

Catalysts (c) used can comprise any of the catalysts conventional for the production of polyurethane. These catalysts are described by way of example in "Kunststoffhandbuch, Band 7, Polyurethane" [Plastics handbook, volume 7, Polyurethanes], Carl Hanser Verlag, $3^{rd}$ edition 1993, chapter 3.4.1. Materials used here are by way of example organometallic compounds, for example tin complexes, zinc complexes, titanium complexes, zirconium complexes, iron complexes, mercury complexes or bismuth complexes preferably organotin compounds, for example tin(II) salts of organic carboxylic acids, e.g. tin(II) acetate, tin(II) octoate, tin(II) ethylhexanoate and tin(II) laurate and the dialkyltin (IV) salts of organic carboxylic acids, e.g. dibutyltin diacetate, dibutyltin dilaurate, dibutyltin maleate and dioctyltin diacetate, and also phenyl mercury neodecanoate, bismuth carboxylates, for example bismuth (III) neodecanoate, bismuth 2-etyhlhexanoate and bismuth octanoate, and mixtures. Other possible catalysts are highly basic amine catalysts. Examples of these are amidines, for example 2,3-dimethyl-3,4,5,6-tetrahydropyrimidine, tertiary amines, for example triethylamine, triethylenediamine, tributylamine, dimethylbenzylamine, N-methyl-, N-ethyl-, N-cyclohexylmorpholin, N,N,N'N-tetramthylethylenediamine, N,N,N', N'-tetramethylbutandiamine, N,N,N'N-tetramethyl-hexandiamine, pentamethyldiethylenetriamine, tetramethyldiaminoethylether, bis-(dimethylaminopropyl)urea, dimethylpiperazin, 1,2-dimethylimidazole, 1-azabicyclo[3.3.0]octane and preferably 1,4-diazabicyclo[2.2.2]octane, 1,8-diazabicyclo[5.4.0]undecene-7-ene and alkanolamine compounds, for example, triethanolamine, triisopropanolamine, N-Methyl- and N-ethyldiethanolamine and dimethylethanolamine. The catalyst can be used individually or in the form of mixtures. Catalysts (c) used optionally comprise mixtures of metal catalysts and of basic amine catalysts. The catalysts (c) preferably comprise amine catalysts, and it is particularly preferable that no metal catalysts are used.

In a particular embodiment, these catalysts, in particular the amine catalysts, are used in the form of blocked catalysts, for example catalysts blocked by proton donors. Proton donors used can preferably comprise carboxylic acids or phenols and/or other aromatic alcohols. Proton donors used particularly preferably comprise aromatic alcohols. The molar ratio here of groups acting as proton donor in the proton donor to protonatable amine groups in the amine catalyst is preferably from 0.9:1.0 to 1.1:1.0. It is particularly preferable that blocked amine catalysts used here comprise blocked 1,8-diazabicyclo[5.4.0]undec-7-ene. Possible blocking agents used can comprise phenols or carboxylic acid derivatives, for example phenol or phthalic acid.

The proportion of the catalyst (c) here is preferably from 0.05 to 10% by weight, particularly preferably from 0.1 to 5% by weight and in particular from 0.1 to 2.5% by weight, based on the total weight of components (b) to (e). The catalyst here is preferably used in such a way that the gel time of the pultrusion resin system of the invention after mixing of components (a) to (e) at 25° C. is more than 10 minutes, particularly more than 12 minutes and less than 60 minutes and in particular more than 15 and less than 60 minutes. The selection of the catalyst is moreover such that complete hardening of the pultrusion resin system of the invention after mixing of components (a) to (e) at 220° C. takes place within 60 seconds, particularly preferably from 0 to 45 seconds and in particular from 5 to 30 seconds.

The open time here is determined as the time during which the viscosity of the reaction mixture increases at constant temperature to an extent such that the stirring force required exceeds the specified stirring force of the Shyodu 100 Gel Timer, 2012 version. 200 g of reaction mixture are used as sample in each case here and are mixed for 30 s at 1950 rpm in a high-speed mixer, and a Shyodu 100 Gel Timer, 2012 version with an associated wire stirrer is used to stir the mixture at 20 rpm at room temperature in a PP beaker, diameter 7 cm, until the viscosity, and therefore the stirring force required for the reactive mixture, exceeded the stirring force of the gel timer.

In order to determine full hardening at 220° C., the components for the production of the polyurethane reaction mixture are weighed at room temperature into a beaker and mixed for 30 seconds by means of a high-speed mixer at 2000 revolutions per minute.

A Pasteur pipette is used to place 10 mL of the system onto a plate with surface temperature 220° C. The time (in s) from application to the plate to full hardening is the curing time at the corresponding temperature. Full hardening has been achieved when the sample no longer exhibits adhesion in contact with a wooden spatula.

Mold-release agents (d) used can comprise any of the mold-release agents conventionally used in the production of polyurethanes, examples being long-chain carboxylic acids, in particular fatty acids, for example stearic acid, amines of long-chain carboxylic acids, for example stearimide, fatty acid esters, metal salts of long-chain carboxylic acids, for example zinc-stearate, and silicones. Particularly suitable materials are the internal release agents obtainable specifically for pultrusion, e.g. from Axel Plastics or from Würtz. In a particularly preferred embodiment, internal release agent used comprises Pul5 K release agent from Würtz.

The quantity usually used of mold-release agents is from 0.5 to 10% by weight, preferably from 1 to 6% by weight and in particular from 1.5 to 4% by weight, based on the total weight of components (a) to (e).

Auxiliaries and additional substances (e) used can comprise any of the auxiliaries and additional substances known for the production of polyurethanes. Examples that may be mentioned are surface-active substances, adhesion promoters, fillers, dyes, pigments, flame retardants, hydrolysis stabilizers, viscosity reducers, water scavengers, antifoams, and also fungistatic and bacteriostatic substances. These substances are known and are described by way of example in "Kunststoffhandbuch, Band 7, Polyurethane" [Plastics handbook, volume 7, Polyurethanes], Carl Hanser Verlag, $3^{rd}$ edition 1993, chapters 3.4.4 and 3.4.6 to 3.4.11.

Additives that can be used for water adsorption can therefore comprise by way of example aluminosilicates selected from the group of the sodium aluminosilicates, potassium aluminosilicates, calcium aluminosilicates, cesium aluminosilicates, barium aluminosilicates, magnesium aluminosilicates, strontium aluminosilicates, sodium aluminophosphates, potassium aluminophosphates, calcium aluminophosphates and mixtures thereof. It is particularly preferable to use mixtures of sodium aluminosilicates, potassium aluminosilicates and calcium aluminosilicates in castor oil as carrier.

The number-average particle size of the additive for water absorption is preferably not more than 200 µm, particularly preferably not more than 150 µm and in particular not more than 100 µm. The pore width of the additive of the invention for water absorption is preferably from 2 to 5 Ångstroms.

If an additive for water absorption is added, the quantity added thereof is preferably more than one part by weight, particularly preferably in the range from 0.5 to 5 parts by weight, based on the total weight of components (b) to (e).

Adhesion promoters used can comprise silanes, for example isocyanate silanes, epoxysilanes or aminosilanes. These substances are described by way of example in E. P. Plueddemann, Silane Coupling Agents, 2nd edn., Plenum Press, New York, 1991 and in2. K. L. Mittal, edn., Silanes and Other Coupling Agents, VSP, Utrecht, 1992.

Viscosity reducers used can by way of example comprise γ-butyrolactone, propylene carbonate, and also reactive diluents such as dipropylene glycol, diethylene glycol and tripropylene glycol.

The pultrusion resin system of the invention preferably comprises less than 2% by weight, particularly preferably less than 1% by weight, of substances that have a boiling point below 200° C. at standard pressure. The viscosity of the pultrusion resin system immediately after mixing of components (a) to (e) is preferably less than 1500 mPas, particularly preferably less than 1200 mPas and in particular less than 1000 mPas at 25° C. in accordance with DIN 53019-1 to 3. The quantitative proportions in which components (a) to (e) are mixed here is preferably such that the isocyanate index is from 90 to 140, particularly from 100 to 130 and in particular from 115 to 125. For the purposes of the present invention, the expression isocyanate index here means the stoichiometric ratio of isocyanate groups to isocyanate-reactive groups, multiplied by 100. The expression isocyanate-reactive groups here means all of the isocyanate-reactive groups comprised in the reaction mixture, but not the isocyanate group itself.

In this process, the components of a pultrusion resin system of the invention are mixed to give a polyurethane reaction mixture, and a fiber material is wetted with the resultant reaction mixture. The procedure usually used here is the two-component process. This first produces a polyol component (B) comprising the compounds (b) having at least two groups reactive toward isocyanates, and catalyst (c), and also mold-release agent (d) and optionally other auxiliaries and additional substances (e). This component is then reacted with the isocyanates to give the pultrusion resin system.

The wetted fiber material is then molded, and the reaction mixture is hardened. For the purposes of the invention, the expression reaction mixture is used here for the mixture of components (a) to (e) when reaction conversions are below 90%, based on the isocyanate groups.

The mixing of the components of the pultrusion resin system of the invention here can take place in a manner that is conventional for the production of polyurethane-based reaction mixtures, for example in the high-pressure or low-pressure process.

It is essential to the invention that at the juncture of mixing with the di- or polyisocyanates (a) the pH of the compounds having at least two groups (b) reactive toward isocyanate is in the range from 6.5 to 8.5, preferably from 7.0 to 8.5 and in particular from 7.5 to 8.4. If the two-component process is used it is essential to the invention that at the juncture of mixing with the di- and polyisocyanates (b) the polyol component (B) has the appropriate pH.

The pH can be established via addition of substances that affect pH, for example via addition of hydrogen donors or hydrogen acceptors. Specified examples of possible hydrogen donors comprise carboxylic acids, for example acetic acid or citric acid, and mineral acids, for example phosphoric acid. Specified examples of possible proton acceptors are bases, for example amine compounds, and salts of weak acids, for example alkali metal salts of carboxylic acids or of polybasic mineral acids such as phosphoric acid. A particularly preferred embodiment uses proton donors and proton acceptors together in a mixing ratio that the pH compounds having at least two groups (b) reactive toward isocyanates is stabilized in the range from 6.5 to 8.5. The substances that affect pH here preferably have no groups reactive toward isocyanate, for example carboxylic acid groups or amino groups. A particularly preferred combination of proton donors and proton acceptors here involves alkali metal hydrogenphosphates, in particular with sodium hydrogen phosphates. In particular, a system made of disodium hydrogenphosphate and sodium dihydrogenphosphate is used.

It is preferable here that the content of water in the pH-stabilized component, for example in the compounds having at least two groups (b) reactive toward isocyanates, or in polyol component (B), is minimized. The content of water in components (b) to (e) is therefore preferably at most 1% by weight, particularly preferably at most 0.5% by weight and in particular 0.2% by weight, based in each case on the total weight of components (b) to (e). The water content here is based on free water that is available to the reaction with isocyanate. Bound water, for example water bound within water scavengers, is ignored when maximal water content is defined.

Fiber material used can comprise any of the types of continuous fibers. The expression continuous fiber here means a fiber material with a length of at least a plurality of meters. These materials are by way of example unwound from rolls. Fiber material used here can comprise individual fibers, known as fiber rovings, braided fibers, fiber mats, laid fiber scrims and woven fibers. In particular in the case of composite fiber materials such as braided fibers, twisted fibers, laid fiber scrims or woven fibers, the individual fibers comprised in these fiber structures can also comprise shorter individual fibers, but the actual composite fiber material must take the form of continuous material. It is preferable that the fiber material comprises, or consists of, glass fiber, glass mats, carbon fiber, polyester fiber, natural fiber, aramid fiber, basalt fiber or nylon fiber or a combination thereof; it is particularly preferable to use carbon fibers or glass fibers, or else a combination of carbon fibers and glass fibers.

The wetting of the fiber material preferably takes place in a closed mold. The temperature during the wetting of the fiber material is preferably below 100° C., preferably from 0 to 75° C., particularly preferably from 10 to 50° C. and in particular from 15 to 35° C. The proportion of fiber material here is preferably from 10 to 90% by weight, particularly preferably from 30 to 90% by weight, in particular from 60 to 90% by weight, based on the finished pultrudate.

After wetting, it is preferable that the fiber material wetted with the reaction mixture is drawn through a mold. The cross-sectional shape of the mold here, perpendicularly to the direction in which the wetted fiber material is drawn, can be as desired, but as far as possible constant, for example a slot shape or round shape, an L shape, a T shape, or else a more complex shape. The temperature of the mold here is preferably from 150 to 250° C., with resultant hardening of the polyurethane reaction mixture to give the finished polyurethane.

It is preferable that the pultrudate is drawn off from the mold at a velocity of more than one meter per minute. The take-off velocity is particularly preferably more than 1.5 meters per minute and in particular more than 2.0 meters per minute. The resultant pultrudate is usually cut to the desired length. In a particularly preferred embodiment, the cross section of the pultrudate differs from that of a flat profile, examples being L profiles, V profiles and U profiles and profiles of greater complexity.

The present invention further provides a pultrudate obtainable by the process of the invention. This pultrudate exhibits excellent surface quality and wetting quality. In the case of flat profiles, the mechanical properties of the pultrudates are identical at take-off velocities of 0.5 m/min and take-off velocities of 1.5 m/min.

The invention will be illustrated below with reference to examples:

Starting Materials:
Polyol 1: Glycerol-started polypropylene oxide with OH number 400 mg KOH/g
Polyol 2: Glycerol-started polypropylene/polyethylene oxide with functionality 2.7 and with OH number 42 mg KOH/g
Polyol 3: Glycerol-started polypropylene oxide with OH number 805 mg KOH/g
Polyol 4: Polypropylene glycol with OH number 55 mg KOH/g
Polyol 5: Dipropylene glycol
Cat 1: Phenol-blocked 1,8-diazabicyclo[5.4.0]undec-7-ene (molar ratio 1:1)
Cat 2: Potassium acetate dissolved in monoethylene glycol (ratio by weight 2:3)
IMR 1: Fatty-acid-based mold-release agent
pH: pH of polyol component
Iso 1: Polymeric diphenylmethane diisocyanate
Iso 2: Monomeric diphenylmethane diisocyanate
Iso 3: Monomeric diphenylmethane diisocyanate comprising carbonidimide-modified diphenylmethane diisocyanate
Acid: Phosphoric acid
Buffer: Buffer system comprising disodium hydrogen phosphate and sodium dihydrogen phosphate Profiles with rectangular cross section (35×4 mm$^2$) and with fiber content about 54% by volume were manufactured at take-off velocities of from 0.2 to 1.0 m/min in a mold made of chromed steel. Fiber material used here comprised StarRov 907 4800 tex glass fiber from Johns Manville Slovakia.

Table 1 collates the precise composition of the polyurethane systems, and also a characterization of the resultant pultrudates. A first step here produced a polyol component with varying pH. Comparative example 1 here comprised no pH-regulating additions; comparison 2 comprised phosphoric acid.

Table 1 shows that with adjustment of pH to the range from 6.5 to 8.5 pultrudates were obtained with particularly low take-off forces and with excellent surfaces. pH was determined here with a glass electrode (DMP Titrino 785 tester with Methrom 6.0229.100 electrode). Calibration solutions used were from Methrom: pH 4 buffer, pH 7 phosphate buffer and pH 9 borate buffer.

The invention claimed is:

1. A process for the production of a pultrudate comprising:
   mixing
   a) di- or polyisocyanates,
   b) compounds having at least two groups reactive toward isocyanates,
   c) at least one amine catalyst,
   d) mold-release agent and optionally,
   e) other auxiliaries,
   to give a pultrusion resin system, wherein the di- or polyisocyanates (a) are mixed with a polyol component (B), comprising compounds (b) having at least two groups reactive toward isocyanates, at least one catalyst (c), mold-release agent (d) and optionally other auxiliaries (e), and a pH of the polyol component (B) is from 6.5 to 8.5;
   wetting a fiber material with the pultrusion resin system, wherein the wetting of the fiber material takes place in a closed mold and the temperature during the wetting is from 0 to 75° C.; and
   drawing the wetted fiber material through a mold at a take-off velocity greater than one meter per minute.

2. The process for the production of a pultrudate according to claim 1, wherein a water content in the polyol component (B) is less than 1% by weight, based on a total weight of the polyol component (B).

3. The process for the production of a pultrudate according to claim 1, wherein the polyol component (B) comprises a buffer system comprising polybasic inorganic acids.

4. The process for the production of a pultrudate according to claim 1, wherein the mold-release agent (d) comprises fatty acid and/or fatty acid ester.

TABLE 1

|  | CE 1 | CE 2 | IE 1 | IE 2 | IE 3 | IE 4 | IE 5 | IE 6 |
|---|---|---|---|---|---|---|---|---|
| Polyol 1 | 45.0 | 45.0 | 45.0 | 45.0 | 45.0 | 45.0 | 43.3 | 43.3 |
| Polyol 2 | 4.5 | 4.5 | 4.5 | 4.5 | 4.5 | 4.5 | | |
| Polyol 3 | 44.5 | 44.5 | 44.5 | 44.5 | 44.5 | 44.5 | | |
| Polyol 4 | | | | | | | 26.3 | 26.3 |
| Polyol 5 | | | | | | | 25 | 25 |
| Cat 1 | 0.5 | 0.5 | 0.1 | 0.1 | 0.7 | 0.7 | 0.2 | 0.2 |
| Cat 2 | | | | | | | 0.2 | 0.2 |
| IMR 1 | 6.5 | 6.5 | 6.5 | 6.5 | 6.5 | 6.5 | 5.0 | 5.0 |
| Buffer | no | no | yes | yes | yes | yes | yes | yes |
| Acid | | yes | | | | | | |
| pH | 8.8 | 6.0 | 8.0 | 8.0 | 8.0 | 8.0 | 8.01 | 8.01 |
| Total | 101.0 | 101.0 | 100.6 | 100.6 | 101.2 | 101.2 | 100.0 | 100.0 |
| Iso 1 | 50.0 | 50.0 | 50.0 | 50.0 | 50.0 | 50.0 | | |
| Iso 2 | 50.0 | 50.0 | 50.0 | 50.0 | 50.0 | 50.0 | | |
| Iso 3 | | | | | | | 100 | 100 |
| Total | 100.0 | 100.0 | 100.0 | 100.0 | 100.0 | 100.0 | 100.0 | 100.0 |
| Quantitative proportions | 100:152 | 100:152 | 100:152 | 100:152 | 100:152 | 100:152 | 100:140 | 100:155 |
| Index | 121 | 121 | 121 | 121 | 121 | 121 | 136 | 150 |
| Velocity [m/min] | immediate blockage | Immediate blockage | 1.5 | 2.5 | 1.5 | 0.5 | 1 | 1 |
| Take-off forces [kN] | — | — | 1.5-3.0 | 2.0-4.0 | 5.0-6.0 | 0.5-2.0 | 5.0-6.0 | 5.0-6.0 |
| Surface | | | very good, no powder | very good, no powder | very good, no powder | very good, no powder | very good, no powder | very good, no powder |

5. The process for the production of a pultrudate according to claim 1, wherein the di- or polyisocyanates (a) comprise polymeric MDI with average functionality from 2.1 to 2.8.

6. The process for the production of a pultrudate according to claim 1, wherein the compounds having at least two groups (b) reactive toward isocyanates comprise polyetherols with average functionality from 2 to 4 and with at least 50% content of secondary OH groups.

7. The process for the production of a pultrudate according to claim 1, wherein an average OH number of the compounds having at least two groups (b) reactive toward isocyanates is from 100 to 1000 mg KOH/g.

8. The process for the production of a pultrudate according to claim 1, wherein a viscosity of the pultrusion resin system immediately after mixing is less than 1500 mPas at 25° C.

9. The process for the production of a pultrudate according to claim 1, wherein the pultrusion resin system comprises less than 2.0% by weight of substances that have a boiling point below 200° C. at standard pressure.

10. The process for the production of a pultrudate according to claim 1, wherein the wetted fiber material is drawn through the mold and hardened, where a temperature of the mold is from 150° C. to 250° C.

11. The process for the production of a pultrudate according to claim 1, wherein the fiber material content is from 30 to 90% by weight.

* * * * *